US012417080B2

(12) United States Patent
Haug

(10) Patent No.: US 12,417,080 B2
(45) Date of Patent: Sep. 16, 2025

(54) SYSTEM AND METHOD FOR GENERATING SINGLE PAGE WEB APPLICATIONS

(71) Applicant: Justin Haug, Wilmington, DE (US)

(72) Inventor: Justin Haug, Wilmington, DE (US)

( * ) Notice: Subject to any disclaimer, the term of this patent is extended or adjusted under 35 U.S.C. 154(b) by 247 days.

(21) Appl. No.: 18/115,172

(22) Filed: Feb. 28, 2023

(65) Prior Publication Data

US 2023/0305819 A1 Sep. 28, 2023

Related U.S. Application Data

(60) Provisional application No. 63/314,479, filed on Feb. 28, 2022.

(51) Int. Cl.
*G06F 8/36* (2018.01)
*G06F 8/38* (2018.01)

(52) U.S. Cl.
CPC . *G06F 8/36* (2013.01); *G06F 8/38* (2013.01)

(58) Field of Classification Search
CPC ..................... G06F 8/36; G06F 8/38
See application file for complete search history.

(56) References Cited

U.S. PATENT DOCUMENTS

| | | | |
|---|---|---|---|
| 10,090,886 B1* | 10/2018 | Bell ................... | H02J 50/80 |
| 10,678,600 B1* | 6/2020 | Darling .............. | G06F 9/505 |
| 10,884,710 B1* | 1/2021 | Bahadur ............ | G06F 8/34 |
| 11,663,199 B1* | 5/2023 | Kiselev ............. | G06F 16/2282 |
| | | | 707/703 |
| 2017/0329580 A1* | 11/2017 | Jann ................... | G06F 9/451 |
| 2018/0225099 A1* | 8/2018 | Rempell ............ | H04L 67/02 |
| 2019/0235843 A1* | 8/2019 | Wu .................... | G06F 8/35 |
| 2020/0264848 A1* | 8/2020 | Stober ............... | G06F 8/40 |
| 2020/0372086 A1* | 11/2020 | Mathews ........... | G06F 16/9566 |
| 2021/0405826 A1* | 12/2021 | Shields .............. | G06F 8/38 |
| 2023/0146421 A1* | 5/2023 | Wilson .............. | G06F 8/34 |
| | | | 715/762 |

* cited by examiner

*Primary Examiner* — Daxin Wu
(74) *Attorney, Agent, or Firm* — Barry Choobin; Patent 360

(57) ABSTRACT

A system and method for creating, testing, deploying, and executing single-page web applications on a client device. The system and method provide an SPA model that includes a user interface, a UI data service, and a set of procedures for communication between the user interface and the UI data service. A runtime can initialize the UI database and a UI data service and render the user interface. Based on a request received through the user interface, the UI runtime allows a copy of the UI database to be modified by the UI data service or the application database getting updated from copy. The runtime can directly update the UI database.

20 Claims, 8 Drawing Sheets

SYSTEM AND METHOD FOR GENERATING SINGLE PAGE WEB APPLICATIONS

CROSS-REFERENCE TO RELATED APPLICATIONS

This application claims priority from a U.S. Provisional Patent Appl. No. 63/314,479 filed on Feb. 28, 2022, which is incorporated herein by reference in its entirety.

FIELD OF INVENTION

The present invention relates to a single page application, and more particularly, the present invention relates to a system and method creating and executing single page applications.

BACKGROUND

Single page applications (SPA) are known in the art as an improvement over traditional html-based web application. SPA is a web application implemented as a single page. The SPA overcomes the drawback of loading a new web page each time to present new information. The SPA provides an app like interface that is faster and more user friendly. In SPA, navigation to other tabs or screens of the SPA do not require a page reload. Moreover, only new data is downloaded and inserted into a screen.

SPA has a lot of advantages, however, implementing SPA requires the developer to have certain skills including knowledge of multiple programming languages. Moreover, building and deploying a single page web application backed by relational database is hard. Currently, the industry best practice is to run an SPA on 3 layers: UI (user interface): web browser; API (application programming interface): web server; and DB (database): relational database server. The layers are used in different ways to represent data: tables in the database, objects in API and UI. This results in object relational impedance mismatch forcing developers to map data from tables to objects and back and to write code to perform data transfer between layers. Such a process has higher likelihood of failure due to network communication and more moving parts. The layers typically use different programming languages, which results in: increased learning curve; context switching, which reduces productivity; and lesser reuse. Moreover, deployment is usually made of parts that need to be deployed separately, making deployment hard.

Considering the advantages of SPA over traditional web applications, a need is therefore appreciated for overcoming the aforesaid drawbacks and limitations with creating and implementing SPAs.

SUMMARY OF THE INVENTION

The following presents a simplified summary of one or more embodiments of the present invention to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a unified object model and the tables/SQL everywhere programming model of SPA that allows for model driven development.

It is another object of the present invention that all runtime data inside of a SPA, both permanent and transient, is stored in database tables.

It is still another object of the present invention that access to data can be provided via SQL across the whole SPA.

It is yet another object of the present invention that the SPA can run offline.

It is a further object of the present invention that the network-related errors can be overcome.

It is still a further object of the present invention that the call to external services (REST APIs, web services, etc.) can be made from within a SPA.

The method further comprises syncing the UI database, by the UI data service, with an external server database. The method further comprises providing access to data through an SQL interface. The method further comprises providing a compiler; and validating the SPA model with the compiler to generate a binary SPA model. The method further comprises providing a local development server, wherein the local development server is configured to allow running, viewing, and testing the SPA model. The method further comprises deploying, by a deployment service, the SPA model. The method further comprises keeping last transaction ID both in the UI database and the external server database, wherein a push to the external server database only succeeds if the last transaction ID matches the one at the UI database. The method further comprises storing the SPA model on the client device for offline use, wherein relevant data is copied to the UI database of the SPA model.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
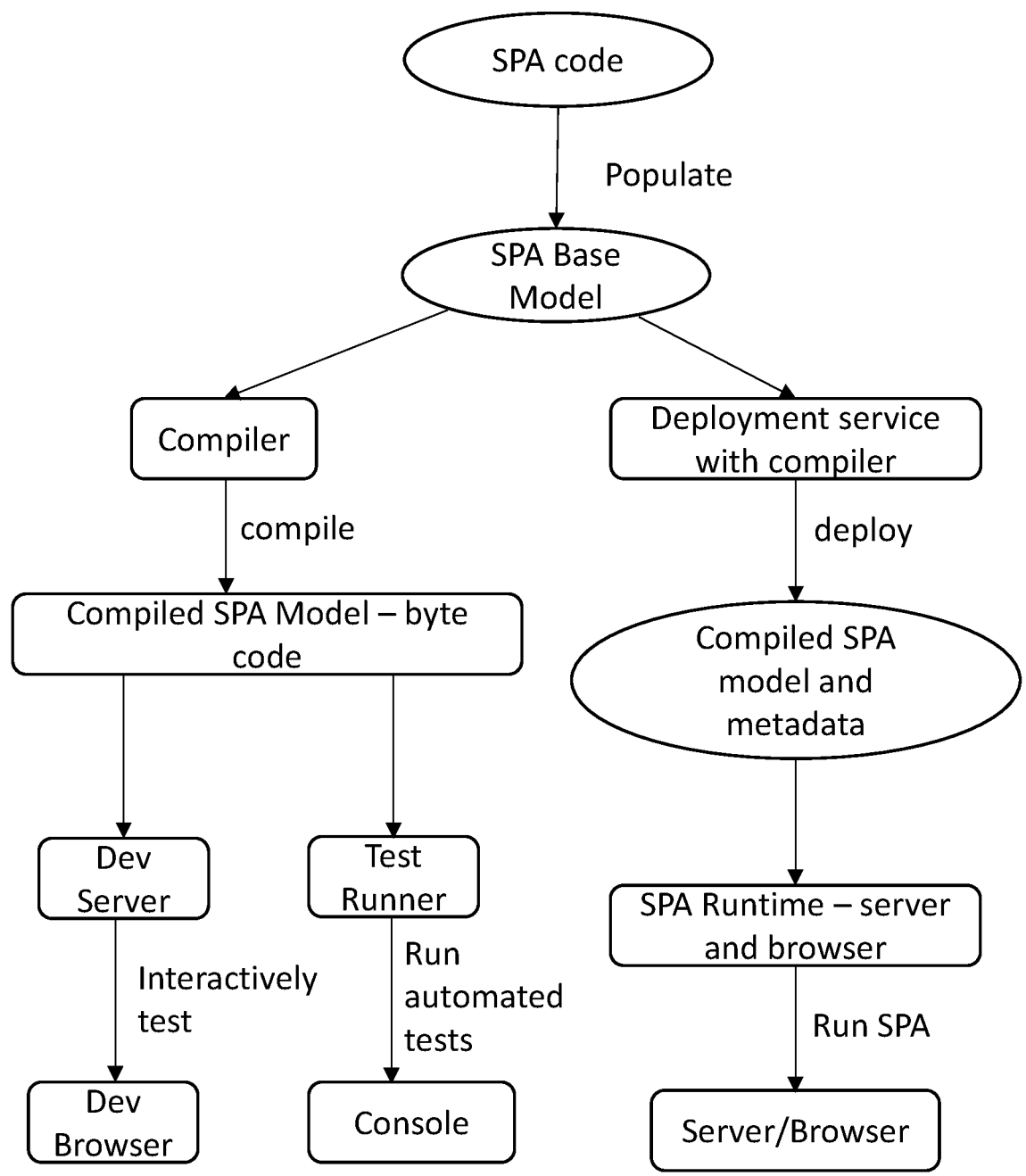
FIG. 1 is a flowchart showing an overview of the system and method, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be outlined in order to provide a thorough understanding of the subject innovation. It may be evident, however, that the claimed subject matter may be practiced without these specific details. In other instances, well-known structures and apparatus are shown in block diagram form in order to facilitate describing the subject innovation.

Definitions

App: An App refers to a SPA in this patent;

App developer/developer: Someone who creates a SPA using embodiments described in this specification.

API server: API (application programming interface) servers provide an API over the Internet, usually in the form of objects (XML/JSON) with none or limited querying capability. The main types are REST, web services and GraphQL. They are typically used as a go between for between user interfaces of SPAs and databases.

Asynchronous Programming: Dealing with programming tasks that take longer to complete and are often hard to predict how long these takes. It deals with how to handle timeouts, eventual completion, errors and more, without blocking forward progress or being able to respond to requests while the task is in progress.

Database: Herein, refer to relational database, where data is stored in tables with rows and fields, tables have relations, e.g., a customer can have orders (1: N). Sometimes database is shorthand for a database engine, which is the program that provides access to relational databases. Also, when referring to database in the SPA, it refers to the main, permanent database or a copy of it, in contrast to a UI database, which is not persisted.

DB: Short for database

Database Server: Also called DB server, refers to a part of a runtime that handles requests to the main database of an application or a copy of it. It may run on a physical server, in the browser or WebView of a native client application. When a database server runs on the client device-browser or native client application—it is referred to as worker herein.

DOM thread: The Document Object Model; The built-in API provided by browsers to both display things to the user as well as respond to various events, such as user interactions.

Factory: A function or program that is used to generate output from some input source. Herein the input and output are object models.

Fallback: When an operation takes too long, the display of something such as a progress icon to indicate to the user that the program is still working on the last request.

JavaScript: A standard scripting language supported by browser for creating interactivity or complete applications.

Meta Programming: Also called generative programming, it is the process of writing programs that write programs.

Model: A simplified abstraction of a SPA leveraging prebuilt components to speed up development of single page applications. A model, or SPA model, provides the instructions that a runtime executes. The relationship of model to runtime is similar to a Word Document to the Word application. The model cannot run by itself, it requires a runtime.

Model Meta Programming: Meta programming where both the input and output are models. The input models provide higher level of abstraction than the output model.

Native Application: An application specifically compiled for an operating system, in contrast to an application that runs inside a web browser.

Native SPA: A SPA which runs in a native application using a WebView as opposed to running inside of a standalone browser.

Object Model: An object model is a model being expressed as a set of objects. Objects are a way to represent information in a hierarchical way, where an object is made up of properties, and a property can be a value, object, or list of objects.

Object Storage: Refers to file storage, where files may store in full but may not be modified. Example is AWS S3 (Simple Storage Service)

REST API: An API over http(s) that conforms to guiding principles and constraints, REST is an acronym and for representational state transfer.

Runtime: The runtime, herein, refers to a set of modules that can execute the SPA. The runtime run on the server as well as on the client device.

Service Worker: A script in a browser that acts as an interceptor for network requests and allows these requests to be fulfilled from a local cache to enable offline usage.

Shared WebWorker: A WebWorker that may be shared among different tabs in a browser of the same domain.

Single Page Web Application (SPA): A web application implemented as a single page. Navigation to other tabs or screens of the application does not require a page reload. Also called Single Page Application, Single Page App or SPA. Note that a SPA is not limited to only running inside a browser but may also run inside of a native application using a WebView control.

SPA Model: Herein an SPA model refers to a complete object model of a SPA, including definition of database and UI and their interactions, and optionally much more (tests, decision tables, scripts, etc.). Also called app model or base app model.

SQL: Structured query language that provides a standardized, declarative way to read (select) write (insert/update/delete) data from/to a relational database.

Synchronization Service: When using a database copy in a browser, the synchronization service is used to keep the server database and browser database synchronized, i.e. kept up to date. This is especially important in a multi-user environment where changes from one user need to be propagated to other users.

Synchronous Programming: A programming style where no attention needs to be paid for operations that may take longer, each operation finishes before the next one starts.

WASM: Web Assembly, a technology to allow binaries to run directly in a browser, promising more efficient and faster web applications.

WebView: A WebView is a web rendering control and allows native applications to include web content or web applications inside of a native application.

WebWorker: A background thread for execution of JavaScript or WASM logic.

UI data service: A central service, which may run either on the client device or the server, or on both based on the DB run mode. The UI database reads the SPA model (or relevant parts thereof) for instructions on how to handle requests. The UI data service's job is to be a mediator between the main application database and the UI database. The UI data service has an embedded database engine for executing SQL commands against one or more databases. For each request from the UI runtime, it receives a copy of the UI database or parts thereof and also has access to the main database (either master copy or local copy). This allows it to execute queries like "Insert into db.contact select*from ui.contactForm" since it has access to both databases. It then executes the request, which may result in changes to the main database and sends the updates to the UI database back to the UI runtime. One of the key advantages of the invention is that you can choose where to run the database logic and that the same service may run either in the browser or the server. And this can be done without having to rewrite the application but changing one configuration setting (DB run mode) of the application.

Worker: Worker refers to a WebWorker or Shared Worker.

Main Database: Also, referred to herein as application database or main DB. This is a relational database that contains the persisted information of the application, e.g., tables for contacts, orders, vendors, customers, etc. There is a master copy of the database which is always on server storage. Depending on the configuration of the application, specifically the DB run mode of an application, a copy of the database may also reside on the client device (e.g., browser) and persist to on-device storage (e.g., IndexedDb) so it can be accessed offline too. When there is a local copy of the main database running on the client device, the invention provides a way to reliably synchronize data between the master copy and the local copy.

Disclosed are a system and method for creating a unified model of SPA that allows for model driven development. Disclosed are a system and method that allows for unifying the handling of all runtime data inside the SPA. All runtime data in a SPA, both permanent and transient, can be stored in database tables of the UI database. The SPA model includes a UI database, user interface (UI), and a set of procedures for communication between the UI database and the UI. The disclosed runtime can read and write directly in the UI database based on the set of procedures. These set of procedures are independent of any specific programing language syntax. The disclosed system and method provide access to data via SQL across the whole SPA, e.g., "insert into db.Customer select*from ui.CustomerForm" inserts data into the Customer table of the database on the server from the "CustomerForm" table that contains the information entered by a user in the browser form. The incorporation of UI database and avoiding multiple layers helps to fasten the development and deployment with far lesser errors and problems. There is no need to specify any API. Disclosed is a system and method for populating a single object model that contains the database, the UI and their interactions using a single programming language. Data can be accessed using SQL environment avoiding the need for mapping code and configuring data transport between layers. The developer can specify a complete SPA application in a single disclosed object model and programming language. It is understood that the model can be populated by a visual designer instead of a programming language. Also, because of the less and simple code, the development of a SPA application can be automated, for example, using factories. This can significantly improve the productivity of the developers. In one implementation, the set of procedures includes statements/SQL commands. Moreover, records/scalars can be used to simplify single record/single value access.

In certain implementations, disclosed is a method to deploy the model as is or with transformations to a production environment. Disclosed is a runtime that executes the model in said production environment so that the SPA can be used by users. The disclosed system and method may also provide for a model compiler to validate the model and produce optimized binary representation of the model for faster execution. The disclosed system and method may also provide for a development server for interactively running, viewing, and testing the SPA. A test runner may also be provided for running automated tests. A script runner can be provided for automating functions, such as database imports, exports, backups, and migrations.

In certain implementations, the disclosed system and method may also provide a way to leverage higher level SPA models and factories to further minimize SPA code. The disclosed system and method can allow to run the SPA offline in the browser. Other implementations of the disclosed system and method may include providing a way to expose a REST API that can be called from external programs; a way to call external services (REST APIs, web services, etc.) from within a SPA, and a way to add, view and modify files to the SPA.

Referring to FIG. 1 which is a flowchart showing an overview of the disclosed system and method. SPA developer can populate a SPA base model. SPA developer may validate his model with a compiler and generate a binary model for optimized execution. The SPA developer can then run, view, and test the compiled SPA model interactively using a local development server (Dev server shown in the drawing). Alternatively, if the SPA developer has automated tests as part of the SPA model, the SPA developer can test the compiled SPA model locally (test runner in the drawing). When ready, the SPA developer can deploy the SPA model to production using a deployment service. This deploys the whole SPA including database and UI. The runtime can execute the application model and thereby the SPA.

Figure 2:
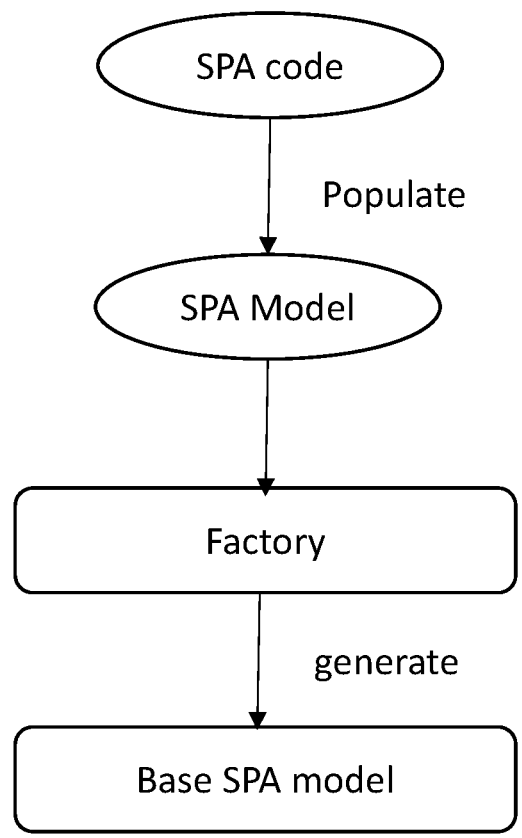
FIG. 2 is a flowchart showing model meta programming, according to an exemplary embodiment of the present invention.

FIG. 2 illustrates the model meta programming to automate the process of populating the SPA model. A developer can populate a higher-level SPA model either with code or visually. A factory generates the SPA base model.

Figure 3:
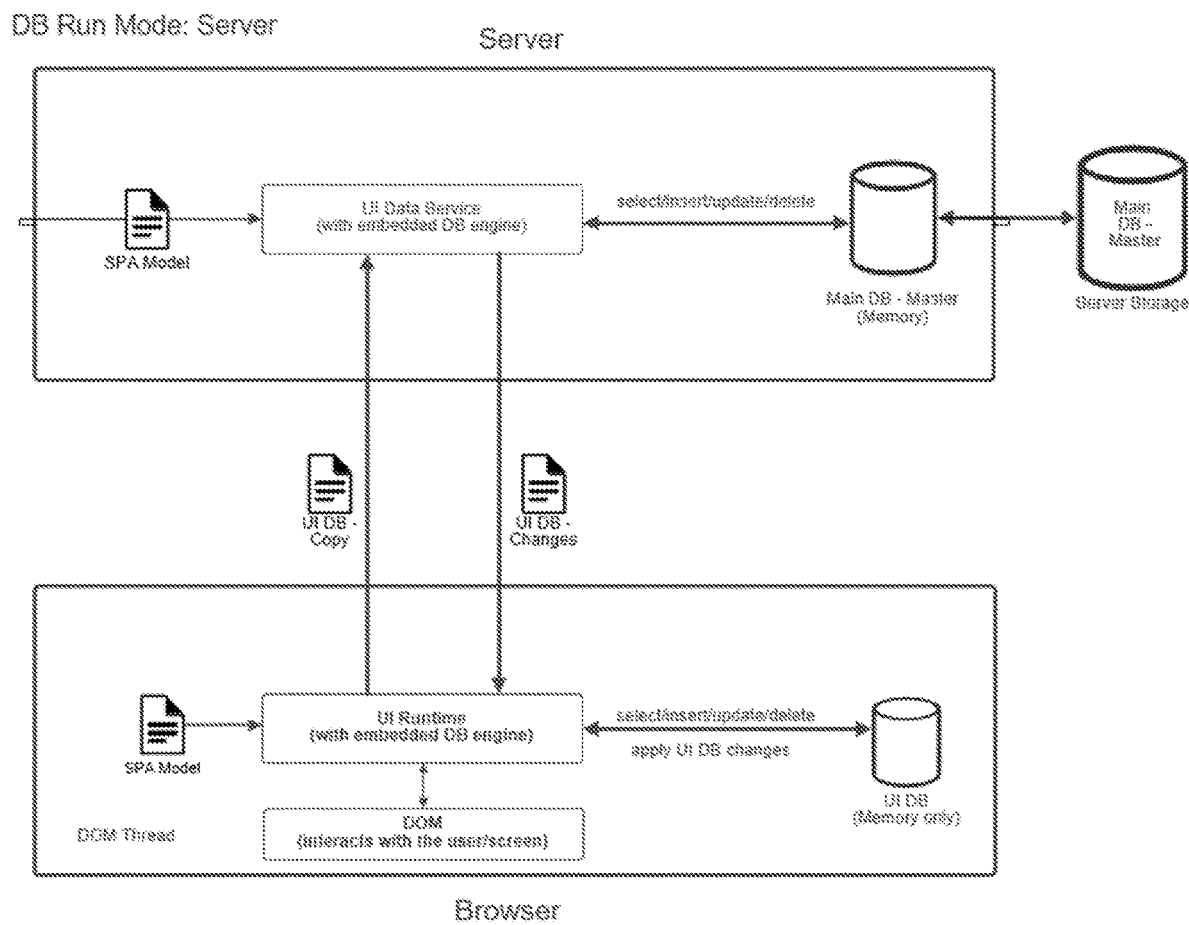
FIG. 3 is a block diagram illustrating DB run mode: Server, according to an exemplary embodiment of the present invention.

Referring to FIG. 3, shown is a data flow diagram describing the execution mode wherein the application database runs on the server i.e., the configuration used uses a DB run mode: server. This database, also referred to herein as application database or the main database runs on the server. The UI data service can run both on server side and the client side of the disclosed system. At server side, the UI data service responds to all requests that involve the main database. Changes to the main database are written directly to the master main database and stored on server storage only. The UI data service can read the SPA model (or relevant parts) at the beginning to know how to handle requests from the UI runtime and know the structure of a UI database and main database. From the SPA model (or relevant parts), the UI data service can know at the beginning what to display and how to react to user input and what to store in the UI database. The UI data service on the server receives requests to read (select) or write (insert/update/delete) data to the main database and processes them. Such requests can be received from UI runtime on the client device over the network for reading or writing.

Figure 4:
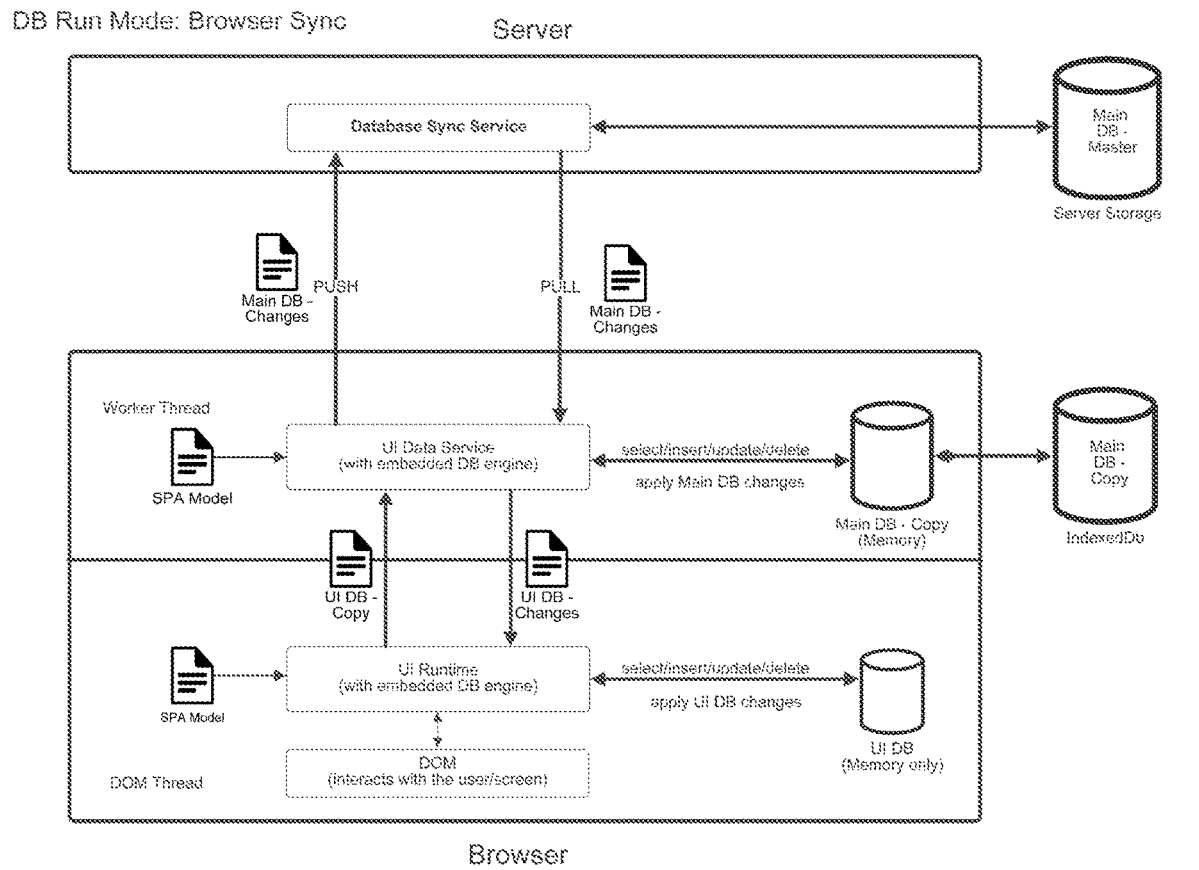
FIG. 4 is a block diagram illustrating DB run mode: Browser Sync, according to an exemplary embodiment of the present invention.

FIG. 4 shows an alternate embodiment of the database run mode which is browser sync. A copy of the application database (main database) from the server may also run on the client device in the browser. Herein, the UI data service may only runs on the client device and responds to all requests to the copy of the application database, also referred to herein as an instance of application database or local application database. There is no SQL running on the server in this configuration, only on the client device. After changes are applied to the local application database, these can be "pushed" to a central database sync service, which, if the local copy of the main database is up to date, will update the master copy of the database on the server device. The application database on the service is also referred to herein as the master application database or a master copy of the application database. A pull request by the UI data service to the database sync service asks if there are any new changes (transactions) in the master application database and if so retrieves them and updates the local application database with the latest changes (transactions) in order to be up to date.

Figure 5:
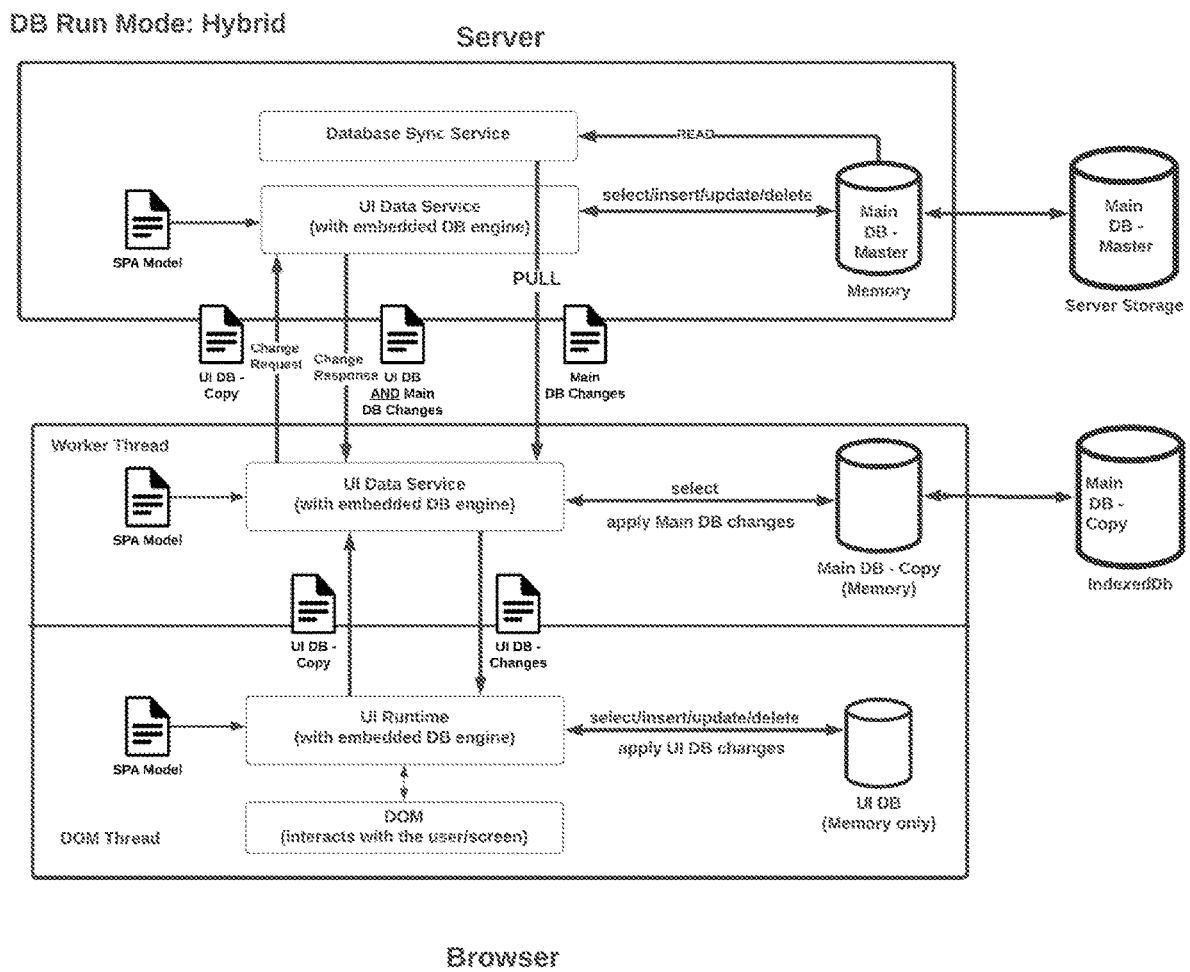
FIG. 5 is a block diagram illustrating DB run mode: Hybrid, according to an exemplary embodiment of the present invention.

In still another embodiment, the DB run configuration can be hybrid of FIG. 3 and FIG. 4, shown in FIG. 5. In this DB run configuration (Hybrid) read requests (select) are executed in the locally running UI data service. Change requests (insert/update/delete) are forwarded from the UI data service running on the client device to the UI data service running on the server. The UI data service running on the server directly updates the master application database and sends back both the changes made to the main DB and UI DB. The UI data service applies the changes to the local application database so that subsequent read requests are up to date and passes the updated UI DB changes to the UI runtime to apply to the master UI DB. Pull requests are issued from the UI data service on the client device (periodically, every N seconds, or based on change notification) to the sync service running on the server to retrieve any changes that may have occurred and keep the local copy of the master application database up to date. The UI runtime talks directly to the UI data service on the client device and sends SQL requests to it. The UI data service directly processes read requests (Select) and returns the result. The UI data service forwards write requests (insert/update/delete) to the UI data service of at the server, wherein the UI data service of the server can processes write requests and stores the results in server storage. The UI data service at the server returns the results to the UI data service on the client device and the UI data service stores the results in the local application database and loads it on startup It is understood that FIGS. 3, 4, and 5 illustrate exemplary embodiments of the DB run modes, however, such illustrations are not limiting, but any configuration of DB run mode is within the scope of the present invention. The UI data service has access to both the UI database (a copy of it, always) and the main database (either the master, if it runs on the server, or a copy, if it runs in the browser) when executing a request issued by the UI runtime, typically as a result of a user action (tapping/clicking a button, link, pressing Enter key, etc.). Because the UI data service has both databases available for a service procedure/proc, it can offer a very simple programming model, where a single SQL statement can be used to for example copy data from the UI database to the main database or copy data from the main database to the UI database. It is understood that single SQL statement or multiple SQL statements may be specified, and both are within the scope of the present invention. The main database contains all persisted state. A copy of the main database may be in the browser and may be persisted to the user's device for offline use. If a copy is used, it will be synced with the main database.

Figure 6:
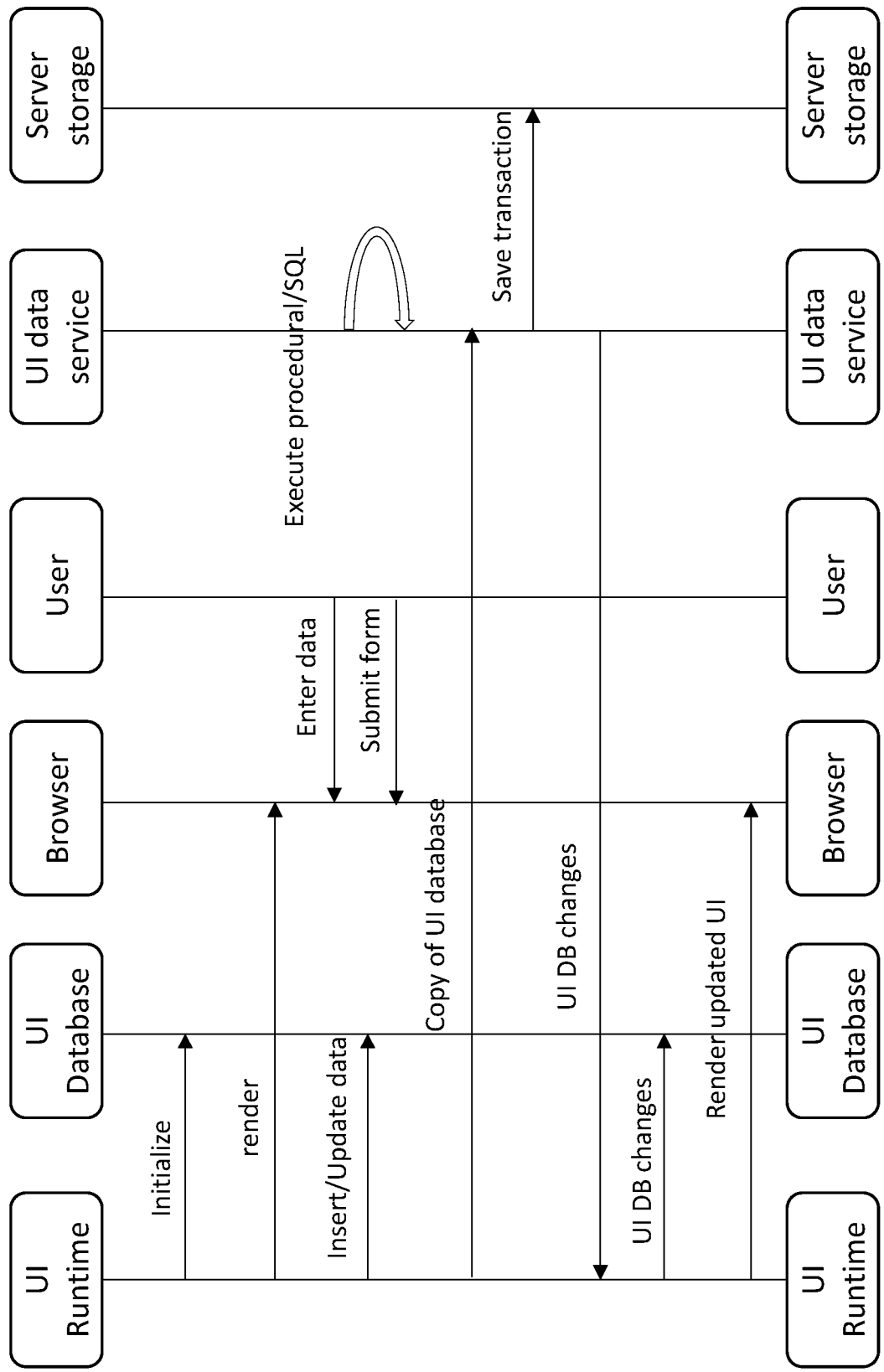
FIG. 6 is a block diagram illustrating state management for form submission, according to an exemplary embodiment of the present invention.

FIG. 6 is an environmental view shown as sequence diagram describing the interactions between various actors involved when showing a form in a browser, entering data, and submitting the form in the SPA context. In FIG. 6, the UI data service runs on the server, i.e. DB run mode="Server". The UI runtime initializes the UI database; The UI runtime renders the form in the browser; The user enters data; This causes the UI runtime to update the UI database with the information provided by the user; The user submits the form; The UI runtime packages the UI database or relevant subset and sends it to the UI data service. The UI data service may reside in the client device or server or both, depending on execution mode (see FIGS. 3, 4 and 5).

The UI data service at the server can execute the SQL statement or statements (part of a procedure); The UI data service at the server commits/saves the transaction(s) to server storage; The UI data service at server can return the changes to the UI data service at the client; The UI runtime can update the UI database with the changes; and the UI runtime renders the updated UI based on the UI database changes.

Figure 7:
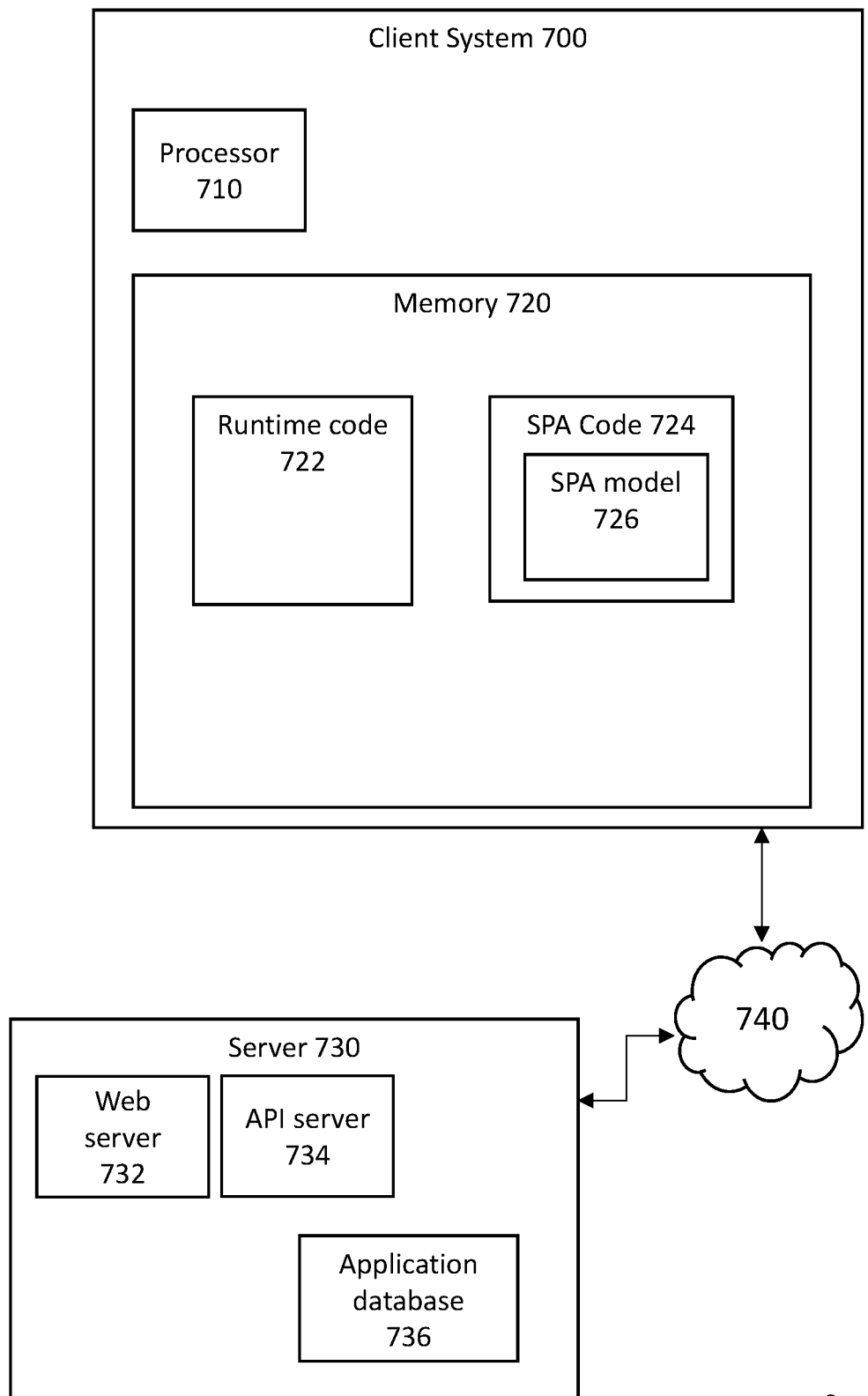
FIG. 7 is a block diagram showing an architecture of the client-side system, according to an exemplary embodiment of the present invention.

Referring to FIG. 7 is a block diagram showing the architecture of the disclosed client system 700. The client system 700 includes a processor 710 and memory 720. The processor can be any logic circuitry that responds to, and processes instructions fetched from the memory. The memory may include one or more memory chips capable of storing data and allowing any storage location to be directly accessed by the processor. The memory 720 can include modules according to the present invention for execution by the processor to perform one or more steps of the disclosed methodology. The memory 720 may include a web browser or similar application. The memory may also include the runtime code 722 which upon execution by the processor executes the UI runtime. The memory may further includes a SPA code 724 and a SPA model 726 which upon execution by the processor executes SPA. The UI runtime can generate a user interface, initialize the UI database and the UI data service, wherein the UI runtime can receive information through the user interface and present the information through the user interface. The UI data service may act as a mediator between the main application database and a copy of the UI database. The UI runtime can read and write to the UI database. For example, a user enters data, e.g. fills in a form for a new contact with first name, last name, address, etc. through the user interface. The UI runtime puts this information into the UI database. In another example, the UI runtime can retrieve data from the main database for inclusion in the UI database, e.g. the user enters text in a search text box, e.g. "Vanessa". The UI runtime first updates the UI database and then sends a request with a copy of the UI database to the UI data service with the request to perform a full text search of all contacts where first name or last name contains "Vanessa" (it binds part of the SQL query to part of the UI database state, but it resolves to this). The UI data service then issues a query against the contact table in the main database, gets the result of the search and puts it in a search result table of a copy of the UI database. The updates to the UI database are then sent back to the UI runtime. The UI runtime retrieves and applies the changes to the UI database and then renders the search results in the user interface.

The client system 700 can connect with an external server 730 through a network 740. The network may be a wired network, a wireless network, or may include a combination of wired and wireless networks. For example, the network may be a local area network (LAN), a wide area network (WAN), a wireless WAN, a wireless LAN (WLAN), a metropolitan area network (MAN), a wireless MAN network, a cellular data network, a cellular voice network, the Internet, etc. The server 730 can include a web server 732, an API server 734, and a master application database 736.

Figure 8:
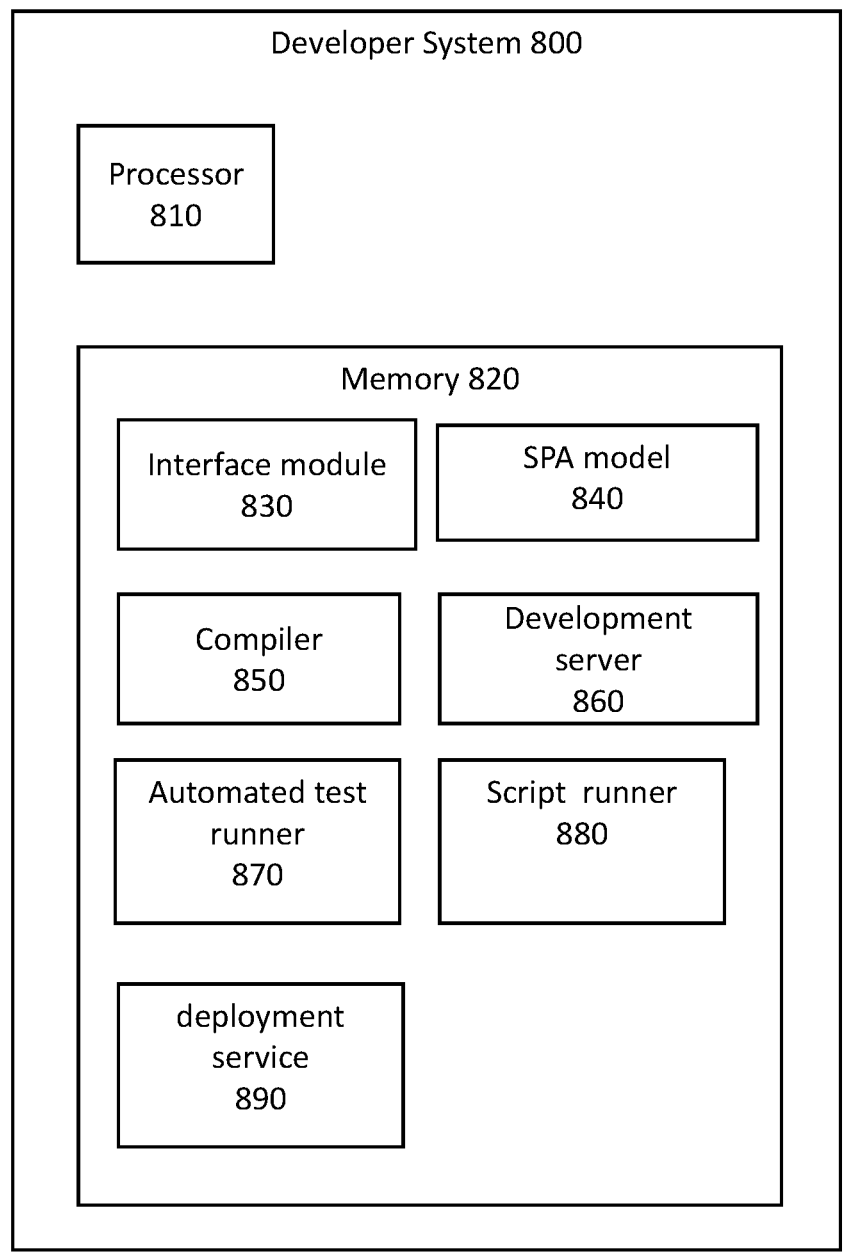
FIG. 8 is a block diagram showing an architecture of the developer-side system, according to an exemplary embodiment of the present invention

Referring to FIG. 8 which shows an exemplary embodiment of the developer system 800. The developer system can also include a processor 810 and a memory 820. The developer system can create, test, and deploy the SPA model 840. The SPA model can be deployed on a client system for execution and generating single web page application on the client system. memory 820 can include an interface module 830, a SPA model 840, a compiler 850, a development server 860, an automated test runner 870, a script runner 880, and a deployment service 890. The interface module, upon execution by the processor, can provide an interface for a developer to interact with the developer system 800. The SPA model 830 can be created, tested, and deployed by the developer through the developer system 800. Compiler 850 can provide for compiling the SPA model to a binary SPA model for execution. The development server 860 can provide a local server environment for testing and running the SPA model. The automated test runner 870 can provide for automating one or more steps in testing of the SPA model. The script runner 880 can be provided for automating functions, such as database imports, exports, backups, and migrations. The deployment service 890 can provide for deploying the SPA. As shown in FIG. 8, the disclosed system and method can provide an integrated development environment for creating, testing, and deploying the SPAs.

In certain implementations, disclosed are a system and method to build a single page web application using a unified model for model driven development, and uses SQL across the SPA, and deploy the model using a single command, dramatically simplifying development and deployment of SPAs.

The disclosed system and method generated SPAs can run in a standalone browser or in native application via a WebView control. Herein, reference to the term "browser" includes "native application" and both are interchangeably used.

The unified object model of the disclosed system and method incorporates complete SPA, including database definition, user interface, as well as user and database interactions. This includes tables, fields, relations, constraints, user interface tree, state objects to define how the user interface is populated from the database, event handler objects that specify what state changes in the UI and/or database should occur as result of some trigger (usually user input), routing information and more. The unified object model may additionally contain testing, scripting, external APIs, web services and files.

In certain implementations, the unified object model can be populated with a programming language, a visual designer, or a mix. One of the key benefits of the unified object model is that it can be specified in a single programming language. There is no need to learn or use different programming languages for creating different layers. This reduces the learning curve significantly and improves productivity through reduced context switching and improved reuse.

The disclosed SPA model is particularly useful by unification of how runtime state is handled. All runtime state inside the SPA, both persistent as well as transitory, is kept in database tables. The invention provides access to data via SQL across the whole SPA, e.g., "insert into db.Customer select*from ui.CustomerForm" inserts data into the Customer table of the main database on the server from the "CustomerForm" table of the UI database that contains the information entered in the browser form (see FIG. 6). The developer no longer must map data between tables and object and back, i.e., no more object relational impedance mismatch. The developer also does not need to specify an intermediate API and send data to it and from there to the database and back but can directly interact between the user interface and the database in the SPA object model. The invention also removes having to deal with network failures between UI and API, and API and database, since the invention does away with the API layer at runtime. Developers must do far less work as a result.

In addition to single SQL statements, the developer may issue multiple SQL statements as part of a procedure, which may also include conditional, looping and error handling programming constructs. Procedures are used in the UI in state objects (read data from database), event objects (write data to database after trigger) and in other areas, such as scripting.

While a developer may directly populate the SPA model, which is also named SPA base model, the developer's productivity can be even further improved by using "model meta programming"—see FIG. 2. The SPA base model is a low-level model, and a developer may instead populate a higher-level SPA model, which generates the SPA base model with help of a generator program (also known as factory). This can reduce the amount of code by a multiple factor, in one example it was 100×. Emphasis added that both the input and output of the meta programming are object models in the same language, and that the disclosed system and method uses a unified way of representing data (database tables) and querying data (SQL) throughout the SPA. This makes meta programming much easier to implement.

The disclosed SPA model may be automatically verified with a compiler to catch errors like SQL errors. The model compiler generates an optimized binary representation of the model for the runtime. However, the compiler may be optional, and an interpreter may also be used, however, the compiler may have the advantage of improved runtime performance and security. In the current implementation, a compiler can be used to eliminate runtime SQL and thereby eliminate SQL injection attacks, which is the main argument against the UI directly interacting with the database.

In certain implementations, the disclosed system and method may also include a development server for a developer to run, view and interactively test the SPA before deploying it to production.

In certain implementations, the disclosed system and method may also include an automated test runner for a developer to automatically test the SPA model.

In certain implementations, the disclosed system and method may also provide a deployment service to deploy the SPA model to a production environment. In its preferred implementation, it includes the compiler to validate and optimize the SPA model.

The runtime's primary role is to execute the SPA model. The runtime is distributed, with parts of it running in a browser and parts of it on the server. The UI rendering and interactivity is handled by the UI runtime, which always runs in the browser. The UI runtime does have an embedded database engine to support the SQL everywhere model.

For the main database processing there may be multiple modes of execution. In one case, a copy of the database may run in the browser and synchronize with a main database via a synchronization service, as shown in FIG. 4. All SQL is run in the browser, and only the resulting transactions are synchronized with help of the synchronization service, using pull for reading and push for writing. When the database engine is running in the browser it may run in a Shared Worker of WebWorker or DOM itself, or in the case of a native application with a WebView, it may run in the native application itself. In the further text "worker" is used for any of the four options.

In another case, a copy of the database may run in the browser and synchronizes via a database server (FIG. 5). The read synchronization is using a pull operation to get the latest transactions that are not yet in the worker's database copy. For writing data, the worker runtime forwards the SQL operation(s) to the server, i.e., the insert/update/delete SQL executes on the server.

Still in another case, the application database may run only on a server, as shown in FIG. 3. All SQL executes on the server.

The mode of execution is specified in the model and may be globally specified or on a per user or device basis. The SPA code stays the same regardless of which mode is specified.

Database Related Runtime Capabilities

The database related parts of the runtime provide several capabilities to implement the SQL everywhere programming model. It can run in the UI runtime of the browser, in a worker, as well on a server. The database runtime uses an in-memory only database as part of the UI runtime for transient state and can save/load data to/from a client device when part of a worker and save/load data to/from server accessible storage when running on a server. It has a way to track changes so it can synchronize state between different actors, e.g., worker and synchronization service. This can be implemented through a transaction log. It can run directly in the browser without having to install plugins. It supports multi-database SQL for queries that cross areas of the SPA (example above with UI and DB databases in the same SQL). It provides automatic state transfer of the UI state from the UI runtime to the DB server so that the DB server has the UI state database available, this may be the full UI state or as an optimization only the relevant UI state needed to run the SQL (See FIG. 6). It provides automatic state transfer of the updates to the UI database from the DB server to the UI runtime so that a procedure running on the DB server may update state in the UI. (See FIG. 6). It may support transient procedure databases for local tables inside a procedure, so that they too can have tables scoped to the procedure and use cross database (procedure, UI & DB) SQL queries. In addition to regular tables, it may offer simpler syntax for records (single record tables) and scalars (single record, single field tables) for easier development. It may support full text search with typo tolerance to provide full text search of text fields of the database in the browser or server.

UI Runtime Capabilities

The UI runtime provides many capabilities to implement the above programming model. A top-down rendering of the UI tree with routing and a method to ensure changes are properly updated to the DOM. Automated database interactions see above (See FIG. 6). The browser related parts are mostly implemented in WASM for good performance and efficiency.

Synchronization Protocol

The synchronization protocol keeps the copy of the database in the browser and the main database on server in sync, i.e., up to date and consistent. This is done by keeping the last transaction ID both in the client database and main database. A push to the server only succeeds if the last transaction id matches the one at the main database.

Location Transparency of Event Handlers:

The programming model allows for event handlers that contain statements that may run in the UI runtime and statements that run in the UI data service, while defining it inside the same procedure and not requiring to manually transport data back and forth. The UI runtime automatically packages all or relevant UI database state and sends it as well as which service task is being invoked to the UI data service. The UI data service loads the UI database and executes the service task with access to both the main database and UI database, records any changes to the UI database and returns these changes to the UI runtime. The UI runtime receives the changes to the UI database and applies them. After the event handler is complete the UI is re-rendered (see FIG. 6)

Ability to Work Offline

When a copy of the database is running in the worker, part of or the whole SPA may work offline. The UI runtime and worker runtime are downloaded and locally stored by a service worker or are part of a native SPA. The database and the SPA model are also stored on the device. If the user is offline the service worker or native application loads these artifacts from the on-device storage and allows the user to continue to use part of or all of the SPA while being offline.

External Communication Standardization:

All states inside the SPA is stored in database tables, but communication to the outside world typically requires a non-table approach, e.g., XML, JSON, and other hierarchical formats. Communication can be incoming, where an external program calls an API that the SPA exposes to read or write to the database, and communication can be outgoing, where the communication originates from within the SPA, e.g., the user clicks a button, and the SPA calls a web service. The former is called API and the latter web services in this invention. These are optional, i.e., if no external communication is required, a SPA does not define APIs or web services. To allow the seamless integration of these and still use tables and SQL internally, both have a way in the SPA model to map from table to hierarchical and hierarchical to table format, thereby keeping the internal logic standardized to always operate on tables and SQL.

Support of Files:

Files are an optional part of the SPA model. Only the metadata of the file (e.g., name, ID, size, mime type) are stored in the database. Files are given a globally unique ID and stored immutably in object storage. To change a file, one creates a new copy. The SPA runtime has support for adding files as well as caching files at different layers, including the browser, and therefore allows the viewing of these cached files even when offline.

Script Runner:

Scripts are an optional part of the SPA model and allow for automating various tasks, such as database imports, exports, backups and migrations, user management, and more. Scripts have access to databases (e.g., main database, import database) and can leverage SQL as part of the script.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for creating and executing single page web applications, the method implemented within a system, the system comprising a processor and a memory, wherein the method comprises:
   executing a UI runtime for a single web page application based on a Single page applications (SPA) model;
   initializing a UI database and a UI data service, wherein the UI database is not persisted, wherein the UI data service is configured to communicate between the UI database and an application database using an embedded database engine for executing SQL commands;
   rendering, by the UI runtime, a user interface based on data stored in the UI database;
   receiving a request through the user interface by the UI runtime;
   responsive to the request, creating, by the UI runtime, a copy of at least a part of the UI database,
   modifying, by the UI data service, either the copy using data from the application database or the application database using data from the copy, and
   wherein the data service is configured to store permanent and transient runtime data inside of a single page application in database tables.

2. The method according to claim 1, wherein the method further comprises:
   responsive to the request, modifying data in the UI database by the UI runtime,
   wherein the copy comprises the modified data and wherein the application database is updated by the UI data service based on the copy.

3. The method according to claim 1, wherein the copy comprises complete UI database.

4. The method according to claim 1, wherein the copy is updated using data from the application database by the UI data service based on the request, wherein the method further comprises:
   receiving, by the UI runtime, updated copy; and
   updating, by the UI runtime, the data in the UI database based on the updated copy.

5. The method according to claim 4, wherein the method further comprises:
   updating of the user interface, by the UI runtime, using data from the updated UI database.

6. The method according to claim 1, wherein the system comprises a client device and a server device, wherein the UI runtime runs on the client device, the application database is on the server device.

7. The method according to claim 1, wherein the system comprises a client device and a server device, wherein the UI runtime runs on the client device, the application database is an instance of a server-side application database, wherein the instance is on the client device, wherein the method further comprises:
   synchronizing data between the application database on the client device and the server-side application database.

8. The method according to claim 1, wherein the method further comprises:
   populating the SPA model, wherein the SPA model comprises the user interface, the UI database, and a set of procedures for communication between the UI database and the user interface, wherein the SPA model is specified in a single programming language.

9. The method according to claim 8, wherein the UI data service accesses the UI database and the application database based on one or more procedures of the set of procedures, wherein the one or more procedures are Structured Query Language (SQL) based, wherein the set of procedures are independent of any other programing language syntax.

10. The method according to claim 9, wherein the method further comprises:
    providing a local development server, wherein the local development server is configured to allow running, viewing, and testing the SPA model;
    providing a compiler; and
    validating the SPA model with the compiler to generate a binary SPA model.

11. A system for creating and executing single page web applications, the system comprising a processor and a memory, wherein the system is configured to implement a method comprising: method comprises:

executing a UI runtime for a single web page application based on a SPA model;

initializing a UI database and a UI data service, wherein the UI database is not persisted, wherein the UI data service is configured to communicate between the UI database and an application database using an embedded database engine for executing SQL commands;

rendering, by the UI runtime, a user interface based on data stored in the UI database;

receiving a request through the user interface by the UI runtime;

responsive to the request, creating, by the UI runtime, a copy of at least a part of the UI database, modifying, by the UI data service, either the copy using data from the application database or the application database using data from the copy, and wherein the data service is configured to store permanent and transient runtime data inside of a single page application in database tables.

12. The system according to claim 11, wherein the method further comprises:

responsive to the request, modifying data in the UI database by the UI runtime, wherein the copy comprises the modified data and wherein the application database is updated by the UI data service based on the copy.

13. The system according to claim 11, wherein the copy comprises complete UI database.

14. The system according to claim 11, wherein the copy is updated using data from the application database by the UI data service based on the request, wherein the method further comprises:

receiving, by the UI runtime, updated copy; and updating, by the UI runtime, the data in the UI database based on the updated copy.

15. The system according to claim 14, wherein the method further comprises:

updating of the user interface, by the UI runtime, using data from the updated UI database.

16. The system according to claim 11, wherein the system comprises a client device and a server device, wherein the UI runtime runs on the client device, the application database is on the server device.

17. The system according to claim 11, wherein the system comprises a client device and a server device, wherein the UI runtime runs on the client device, the application database is an instance of a server-side application database, wherein the instance is on the client device, wherein the method further comprises:

synchronizing data between the application database on the client device and the server-side application database.

18. The system according to claim 11, wherein the method further comprises:

populating the SPA model, wherein the SPA model comprises the user interface, the UI database, and a set of procedures for communication between the UI database and the user interface, wherein the SPA model is specified in a single programming language and Structured Query Language.

19. The system according to claim 18, wherein the UI data service accesses the UI database, and the application database based on one or more procedures of the set of procedures, wherein the one or more procedures are Structured Query Language (SQL) based, wherein the set of procedures are independent of any other programing language syntax.

20. The system according to claim 19, wherein the method further comprises:

providing a local development server, wherein the local development server is configured to allow running, viewing, and testing the SPA model;

providing a compiler; and validating the SPA model with the compiler to generate a binary SPA model.

* * * * *